United States Patent
Abramovici et al.

(10) Patent No.: US 10,990,931 B2
(45) Date of Patent: Apr. 27, 2021

(54) SYSTEM AND METHOD FOR WORK PERIOD SCHEDULER

(71) Applicant: NICE LTD., Ra'anana (IL)

(72) Inventors: Omer Abramovici, Kfar Saba (IL); Iftach Smith, Hod Hasharon (IL); Charles William Gulledge, Richardson, TX (US)

(73) Assignee: NICE LTD., Ra'anana (IL)

( * ) Notice: Subject to any disclaimer, the term of this patent is extended or adjusted under 35 U.S.C. 154(b) by 590 days.

(21) Appl. No.: 15/274,267

(22) Filed: Sep. 23, 2016

(65) Prior Publication Data
US 2018/0060830 A1    Mar. 1, 2018

Related U.S. Application Data

(63) Continuation-in-part of application No. 15/254,252, filed on Sep. 1, 2016, now abandoned.

(51) Int. Cl.
*G06Q 10/10* (2012.01)
*G06Q 10/06* (2012.01)

(52) U.S. Cl.
CPC ... *G06Q 10/1097* (2013.01); *G06Q 10/06393* (2013.01); *G06Q 10/063112* (2013.01)

(58) Field of Classification Search
CPC .......... G06Q 10/109; G06Q 10/06393; G06Q 10/1097
USPC ........................................................ 705/7.14
See application file for complete search history.

(56) References Cited

U.S. PATENT DOCUMENTS

| 6,044,355 A | 3/2000 | Crockett et al. |
| 7,058,589 B1 | 6/2006 | Leamon et al. |
| 8,566,133 B2* | 10/2013 | Umamaheswaran .. G06Q 10/06 705/7.11 |
| 2013/0142322 A1* | 6/2013 | Grasso ............. G06Q 10/06398 379/265.08 |
| 2018/0034966 A1* | 2/2018 | te Booij ............... H04M 3/5175 |

* cited by examiner

*Primary Examiner* — Mehmet Yesildag
*Assistant Examiner* — Ayanna Minor
(74) *Attorney, Agent, or Firm* — Pearl Cohen Zedek Latzer Baratz LLP

(57) ABSTRACT

A work period scheduler includes one or more data processors configured to receive performance data relating to the performance of one or more individual workers from a database. The performance data is then analyzed to identify one or more workers as a leader, a leader being a worker whose presence in a group of the individual workers results in an improvement in overall performance of said group. Work periods, e.g. shifts, may then be scheduled based on one or more skills attributed to one or more workers wherein the one or more skills includes leader.

17 Claims, 11 Drawing Sheets

FIG. 11

SYSTEM AND METHOD FOR WORK PERIOD SCHEDULER

PRIOR APPLICATION DATA

The present application is a continuation-in-part of prior U.S. patent application Ser. No. 15/254,252, filed Sep. 1, 2016, entitled "SYSTEM AND METHOD FOR WORK PERIOD SCHEDULER", incorporated herein by reference.

FIELD OF THE INVENTION

The present invention relates to systems and methods for scheduling of work periods, also known as shifts, for a number of workers in a workforce.

BACKGROUND

The scheduling of workers' shifts may be performed by a supervisor or manager basing a selection of workers to form a team or suggestion of shift time periods on one or more criteria such as the worker's preferences, skills and individual performance. However, such a conventional, purely human based system, has limitations.

SUMMARY

It has been found that the presence of one or more individuals in a group or team of workers can affect, for good or bad, the overall performance of the group. For example, the presence of such individuals may have a beneficial effect on the motivation of the group as a whole.

Some embodiments of the invention provide a work period scheduler configured to automatically schedule work periods taking account of one or more individuals whose presence in a team is particularly beneficial. A scheduler according to some embodiments of the invention may comprise one or more data processors configured to receive performance data relating to the performance of one or more workers, for example from a database. The performance data may be analyzed to identify one or more workers as a leader, wherein a leader is a worker whose presence in a group of the individual workers results in an improvement in overall performance of said group. Work periods may then be scheduled to make best use of any worker identified as a leader. In general, scheduling may be based on one or more skills attributed to one or more workers, wherein the one or more skills includes leader.

Some embodiments of the invention may be used to provide managers or supervisors with the ability to identify such individuals. Some embodiments of the invention may be used to provide managers or supervisors with the means to compile worker profiles, for example in terms of performance, and compare them with others in order to identify one or more individuals who are driving the group and positively affecting overall team performance. Some embodiments of the invention may provide an opportunity to drive efficiency, improve performance and to increase worker satisfaction by analyzing data of individuals in relation to their team mates.

A leader need not be an individual whose own performance is exceptional. According to some embodiments of the invention, provided that the presence of one individual has an effect on the performance on the other individuals then that one individual may be identified as a leader. The individual may not have been identified as a leader in the traditional sense and it may not be outwardly apparent that he or she has any effect on team performance. According to some embodiments of the invention, one or more individuals whose mere presence has a beneficial effect on the performance of a group of individuals may be identified. An individual may be identified as a leader by reference to one or more performance criteria. Thus it is possible according to some embodiments of the invention, for different individuals being identified as leaders depending on the performance criteria. Some embodiments of the invention may be said to provide adaptive shifts scheduling in the sense that the scheduling of shifts or work periods may be adapted to the particular skills of the workers in ways not hitherto provided.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may be understood by reference to the following detailed description when read with the accompanied drawings. Embodiments of the invention are illustrated by way of example and not limitation in the figures of the accompanying drawings, in which like reference numerals indicate corresponding elements, and in which:

FIG. 11 shows an example shift schedule that may be created according to some embodiments of the invention.

DETAILED DESCRIPTION

Figure 1:
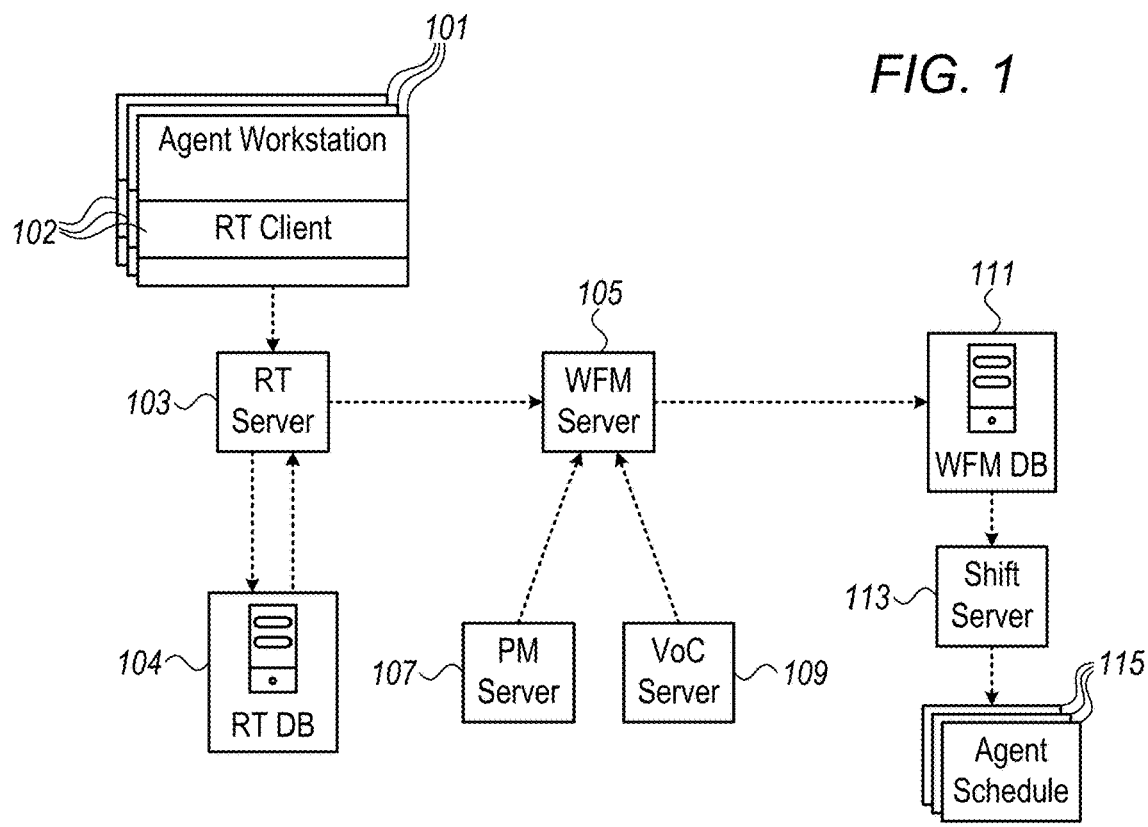
FIG. 1 is a diagram of a workforce management system according to some embodiments of the present invention.

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the invention may be used for work period scheduling, also called shift scheduling for workers in all kinds of fields. A particular example is described herein in which the workers are agents working for, or on behalf of, an organization such as in a contact center. However the invention is not limited to this particular example.

Acronyms

The following acronyms are used in this description:
"ACD"—automatic call distributor
"AHT"—average (call) handling time
"CSAT"—Customer satisfaction
"IA"—Interaction Analysis
"KPI"—Key Performance Indicator
"MVP"—most valuable player (or team member)
"PM"—Performance Manager
"RT"—Real time
"RTAM" Real Time Activity Monitoring
"SLA"—Service Level Agreement
"VoC"—Voice of the Customer
"WFM"—Workforce Management Definitions The words and phrases listed below are intended to be interpreted according to the following definitions unless otherwise stated:

Agent—an individual (e.g., individual worker) who interacts with third parties, for example in a contact center.

Detractor—the opposite of a leader, an individual (e.g., individual worker) whose inclusion or presence in a group of workers is detrimental to the overall performance of the group Interaction—any communication, for example, between a caller (e.g. human) and one or more agents, over a communication network, over any channel including voice and text.

Performance indicator, more commonly known in the art as "Key Performance Indicator" or "KPI", is a measure of the performance of an agent or group of agents, also known as a score. Performance indicators may be according to various criteria such as but not limited to productivity rate and customer satisfaction. A performance indicator is an example of performance data.

Leader—a skill or description attributed to an individual (e.g., individual worker) whose inclusion or presence in a group of workers is beneficial to the overall performance of the group, also known as a "driver".

Shift—work period.

Schedule (used as a verb)—create a schedule, e.g. a plan, timetable, or scheme, for example in the form of a data structure, of for example work periods.

User (end)—any individual (e.g., individual worker) who provides input to a work period scheduler according to an embodiment of the invention.

DESCRIPTION OF FIGURES

Figure 10:
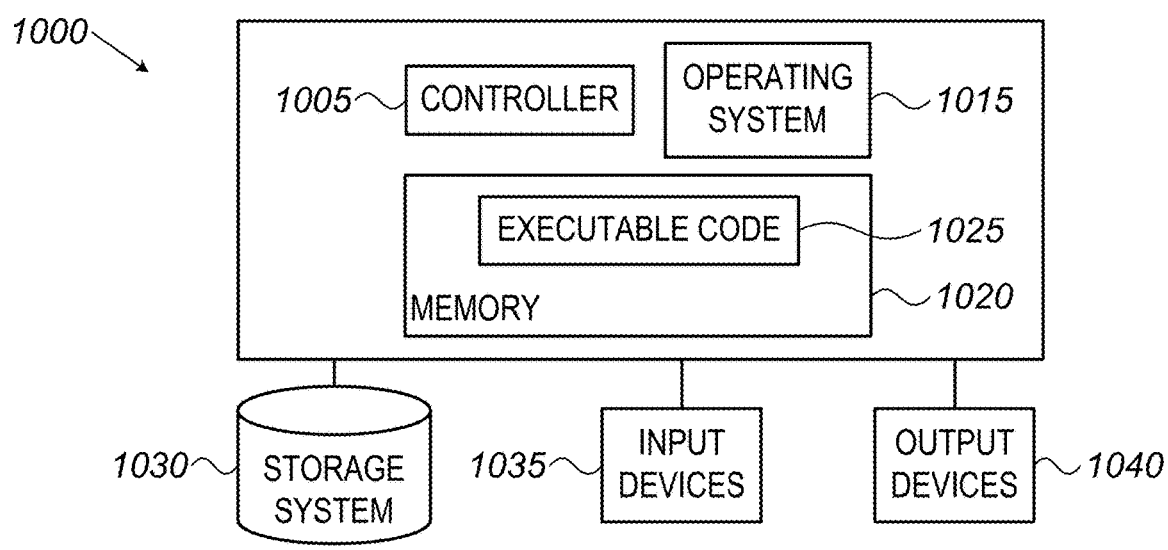
FIG. 10 shows a high level block diagram of an exemplary computing device according to some embodiments of the invention.

FIG. 1 is a diagram of a workforce management system 100 according to some embodiments of the present invention. A system of the kind shown in FIG. 1 may for example be implemented in a contact center in order to schedule the shifts of individuals working in the contact center. However there are numerous other possible implementations for such a system. Each of the components of the system shown in FIG. 1 may comprise one or more computing devices. These computing devices may include components such as shown in FIG. 10, and may be configured to carry out methods or form systems according to some embodiments of the invention by for example executing (or having a processor execute) code or software, and/or by including dedicated code.

The embodiment shown in FIG. 1 includes agent workstations 101, such as personal computers with associated peripheral devices such as but not limited to headsets and input devices such as keyboards and mice. In general, according to some embodiments of the invention, data relating to the work of agents using workstations 101 is analyzed and used for agent group shift scheduling. For example the output of a method according to some embodiments of the invention may be a shift pattern for a group of agents that is optimized, for example according to a performance criterion. Thus the system of FIG. 1 also includes a shift server 113 which outputs one or more agent schedules 115, which may be compiled according to overall agent group performance. Thus according to some embodiments of the invention, agent shift scheduling may be done according to group performance rather than individual performance. The determination of the agent schedules may be performed using an algorithm running on a computer.

In the system shown in FIG. 1, each work station may include one or more processors running or executing one or more applications such as RT application indicated by numeral 102. A RT application may perform many functions. For example in the case of an agent operating a workstation 101 a RT application may collect information in real time relating to interactions between agents and callers such as but not limited to call duration, time allocated for productive applications vs. non-productive applications (e.g. measured by some productivity criterion as known in this technical field), time allocated in business related applications vs. non business related applications, and time that the desktop was idle (no user input for a certain interval) or locked. Any of this information may be used to monitor the performance of the agent.

Information collected by a RT agent may be processed at the workstation. Additionally or alternatively such information may be processed at a RT server 103. The RT server may send information to a RT database 104.

The RT server 103 may provide information including agent performance data to a WFM server 105. The WFM server 105 may receive additional information such as user KPI data for sales goals or other indicators that the user may be using to measure performance using the PM system, from one or both of an PM server 107 and a VoC server 109. The PM server 107 may generate or receive agent performance data separate from the RT server which it feeds into the WFM server 105. The WFM server may then perform additional processing on information provided from the RT server 103. For example the PM server 107 may push KPIs of agents to the WFM server 105. Additionally or alternatively, the VoC server may push customer satisfaction KPIs of agents to the WFM server. Therefore systems according to some embodiments of the invention may be configured such that any one or more of the RT server, the PM server, the VoC server and one or more external servers may feed KPI data to the WFM server 105.

The WFM 105 server may perform various functions including preparing and outputting a workforce management forecast to a WFM database 111. The preparation of the forecast is a process whereby the WFM server 105 may perform calculations on historical data sent for example by an ACD (not shown in FIG. 1) and based for example on a user's SLA and goals it may use mathematical algorithms to define required resources (agents to answer calls for example) for an upcoming period. The shift server 113 may use information in the WFM database 111, for example the workforce management forecast and additional information, optionally also information from other sources, to determine agent schedules 115. The shift server may operate by data mining. Alternatively information for shift scheduling may be pushed to the shift server 113. It will be appreciated that the components of the system of FIG. 1 are shown as separate items for the sake of explanation. In practice any of them may be combined, for example in a single computing device. Similarly the functions of any of the components may be distributed over more than one computing device. Furthermore a computing device implementing any of the functions described with reference to FIG. 1 may not be dedicated to that function and may perform additional functions or operations that are not related to the system of FIG. 1.

According to some embodiments of the invention, the shift server 113 may receive or collect performance data, for example in the form of KPIs, and optionally other data relevant to work period planning, from several different sources and determined in various ways, examples of which are shown in FIG. 1. This may include performance management data, for example from performance server 107, workforce management data, for example from WFM server 105, data resulting from desktop monitoring such as might be provided by RT server 103, human resource (HR) data from an HR database or possibly available from WFM server 105 which may include information such as planned holidays of agents, customer resource management data and many other kinds of data. Historical shifts during which agents have worked may be scanned or otherwise analysed to calculate KPIs. These may be according to specified/selected filters such as but not limited to timeframe, seniority, productivity, CSAT, and sales rate. Averages may be created, for example per KPI, per employee, per shift. Algorithms may be created that mix and match employees that might have worked in the past together (or not) in which their KPI may drive a new target KPI. Agents may be grouped into suggested shifts based on the algorithms. The creation of shifts taking into account so many variables cannot be done by humans in a manual process. Furthermore embodiments of the invention enable the creation of schedules more quickly than is possible by humans using any kind of manual system.

The shift server 113 may perform several functions. Some functions of a shift server according to some embodiments of the invention are shown schematically in FIG. 2. Again it will be appreciated that these functions may be distributed across multiple computing devices or components which may be dedicated to a system according to embodiments of the invention or shared across other functions. A shift server according to some embodiments of the invention may implement some or all of the functions shown in FIG. 2.

Figure 2:
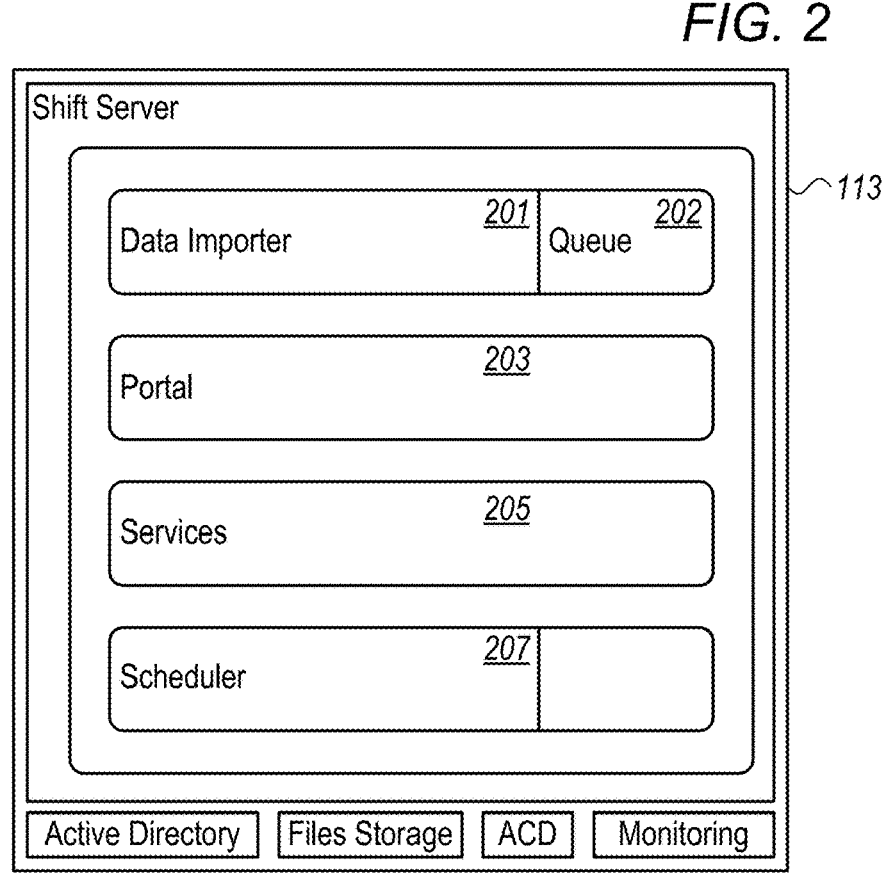
FIG. 2 is a schematic diagram showing some functions of a shift server according to some embodiments of the invention.

The shift server 113 shown in FIG. 2 may include a data importer 201. A component serving as a data importer may allow other components of a system according to embodiments of the invention to export data, such as but not limited to KPI related data, into the shift server 113. Such other components may include for example the PM server 107 and the VoC server 109. Data imported by the data importer 201 may be included in a target which may be defined by a formula, for example defined by a user, that to be maximized. For example, assuming that there are three KPIs that the user is tracking, AHT, % of Customer Retention and CSAT, and that AHT is the most important KPI for this user. In this case an example of a target formula might be: AHT*0.5+CSAT*0.25+% of Customer Retention*0.25. An agent shift pattern may be scheduled in order to maximise the value of the target. In this example the formula is a weighted sum of KPI values.

The data importer is shown to include a queue component 202. A queue component, if provided, may be part of the data importer 201 or scheduler 207 or any other component of the system shown in FIG. 1.

The data importer 201 may be responsible for integration and persistency of the incoming data. Examples for this data are AHT (coming from ACD systems), Agent's Productivity (RTAM), Performance KPIs (PM), CSAT (IA) and more.

The shift server 113 may further include a portal 203. This may for example provide a user interface, which in turn may be used to enable users to receive output from or to input data or instructions to be used by the shift server 113 to determine agent schedules 115. The portal may enable viewing the output, e.g. results of computations, and may also provide an administrative interface to configure the system. Data and instructions input to the shifts server may include any of one or more KPIs, for example to be used in an algorithm running on the shift server to determine the agent schedules; one or more weights, for example to be applied to KPIs; a target formula; and one or more thresholds. Portal 203 may be a web portal, for example if the users and the shifts server 113 are at different geographical locations.

The shifts server 113 may include a services component 205. This may for example provide a business logic layer for the portal 203 for shift scheduling operations, for example according to KPIs or target formulas. Operations of a services component according to some embodiments of the invention are described in more detail with reference to FIGS. 3 and 4.

The shift server 113 may further comprise a scheduler component 207. This may be an engine configured to execute an algorithm on data imported by the data importer 201, for example using data and/or instructions input via the portal 203. The scheduler 207 may for example identify potential group 'leaders'. The information as to which agents are "leaders" may be used in various ways. For example leaders may be scheduled evenly across different shifts.

Also shown in FIG. 2 are additional components which may form part of or interface with a shift scheduler according to some embodiments of the invention including an Active Directory which may be used to authenticate users; File Storage, used for example to transfer data between the ACD and the WFM server, ACD which may provide data to the WFM for forecasting and Monitoring, a component comprising tools used to ensure that the system is functioning as expected.

Figure 3:
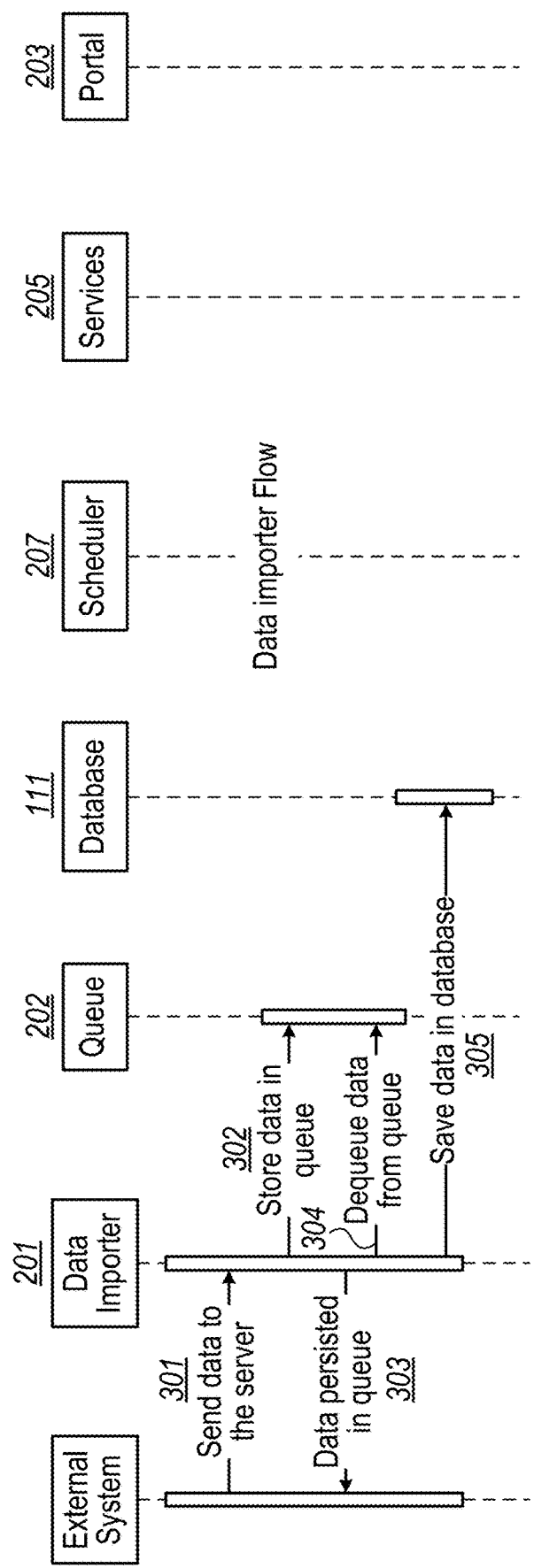
FIG. 3 is a schematic diagram showing an example of data flow between different components shown in FIGS. 1 and 2 according to some embodiments of the invention.

FIG. 3 is a schematic diagram showing an example of data flow between different components shown in FIGS. 1 and 2 according to some embodiments of the invention. In the example of FIG. 3:

Arrow 301 indicates data, for example in the form of messages, being sent from external systems or components to the shift server 113 and being received at the data importer 201. Such external systems or components may for example be any one or more of the other components shown in FIG. 1. Thus for example any system or component that has KPI information may use the data importer 201 to send the KPI information and/or other information to the shift server 113.

KPI information may include, but is not limited to, one or more of the following, which may be in respective fields: agent's identification; date; interval ID (e.g., 5 minutes), the interval being the time over which a KPI is measured or aggregated; KPI ID, e.g. customer satisfaction, productivity, AHT, waiting time; score for that KPI (e.g. 0-100).

Arrow 302 indicates the data importer 201 placing the incoming data messages in a queue, for example at queue component 202.

Arrow 303 indicates the data importer 201 responding to the system or component that sent the data, generically referred to as a "caller", with the persistency status of the data or messages. The persistency status is an indication as to whether data has been persisted successfully, or transferred successfully on the data importer side. It is useful for the caller to know this so that in case of a failure the data can be reposted.

Once data or messages reaches the head of the queue 202, the data importer 201 may retrieve, or dequeue, the data or messages as indicated by arrow 304 and for saving a database as indicated by arrow 305, for example database 111.

Figure 4:
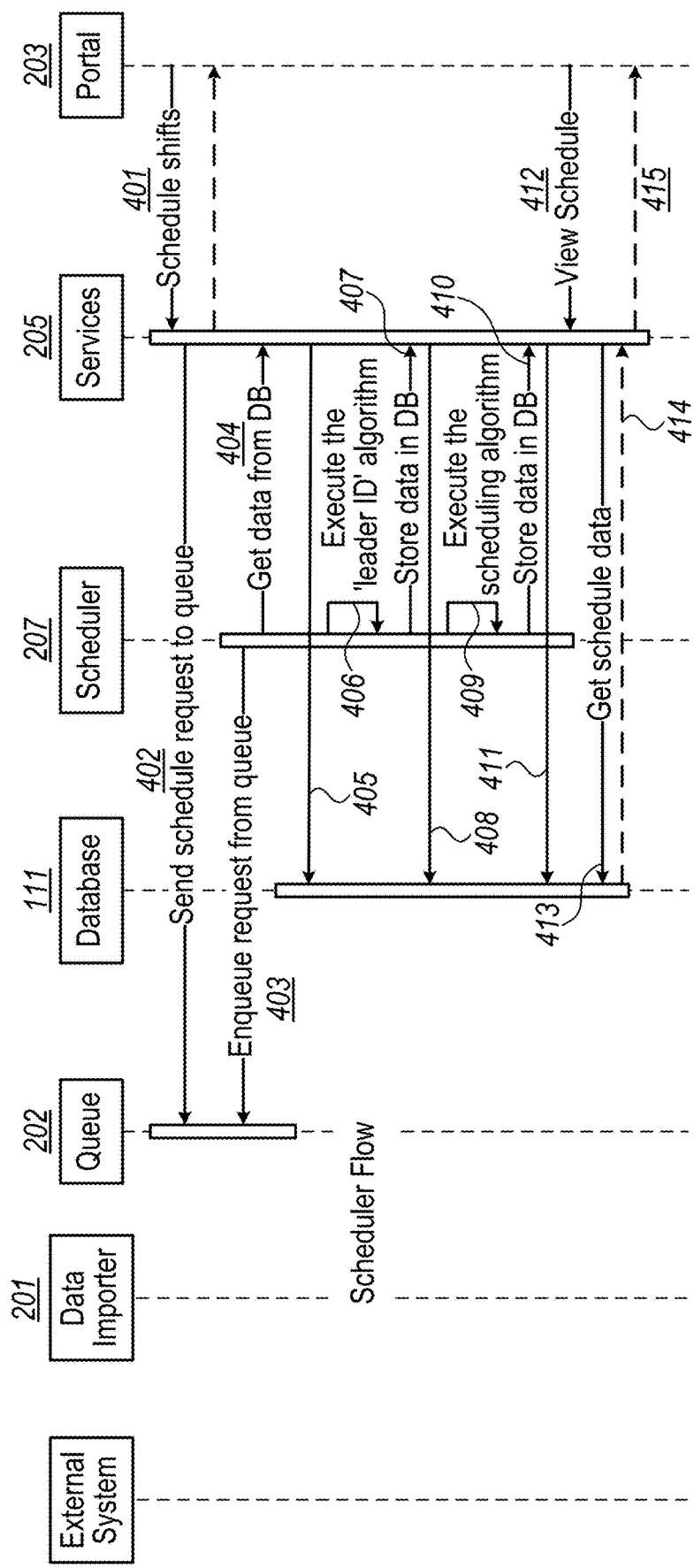
FIG. 4 is a schematic diagram showing an example of data flow between different components shown in FIGS. 1 and 2 according to some embodiments of the invention.

FIG. 4 is a schematic diagram showing an example of data flow between different components shown in FIGS. 1 and 2 according to some embodiments of the invention.

In the example of FIG. 4:

Arrow 401 indicates the portal 203 sending a request to the services component or layer 205 for an agent schedule, or shift schedule. This may have been received at the portal 203 from an end user. The request may include schedule parameters such as but not limited to one or more KPIs; which team, e.g. selection of agents from a pool, to schedule; time frame; target formula.

Arrow 402 indicates the service layer placing the request in a queue such as queue 202 in order to ensure that the scheduler 207 does not receive more requests at the same time than it can concurrently handle.

Arrow 403 indicates the scheduler 207 retrieving a request from the queue.

Arrow 404 indicates the scheduler instructing the service layer to obtain data from the database 111.

Arrow 405 indicates a call from the service layer to the database to read data in the database.

Arrow 406 indicates the scheduler 207 executing a leader identification algorithm in order to identify particular agents whose inclusion or presence has a positive effect on other agents in a group according to one or more KPIs.

Arrow 407 indicates the result of leader identification being returned to the services layer 205 from where it is stored in the database 111 as indicated by arrow 408.

Arrow 409 indicates the scheduler 207 executing a scheduling algorithm in order to determine agent shifts 115. The results of the leader identification are used in the scheduling algorithm.

Arrow 410 indicates the determined shifts being returned to the services layer 205 from where it is stored in the database 111 as indicated by arrow 411.

Arrow 412 indicates a request received via the portal 203 to view a schedule. This may occur at any time during the flow following the initial request to schedule shifts indicated by arrow 401.

Arrow 413 indicates the services layer 205 requesting schedule data from the database 111.

Arrow 414 indicates the schedule data being returned to the services layer 205.

Arrow 415 indicates the schedule data being sent from the services layer to the portal 203 for viewing by the user.

Figure 5:
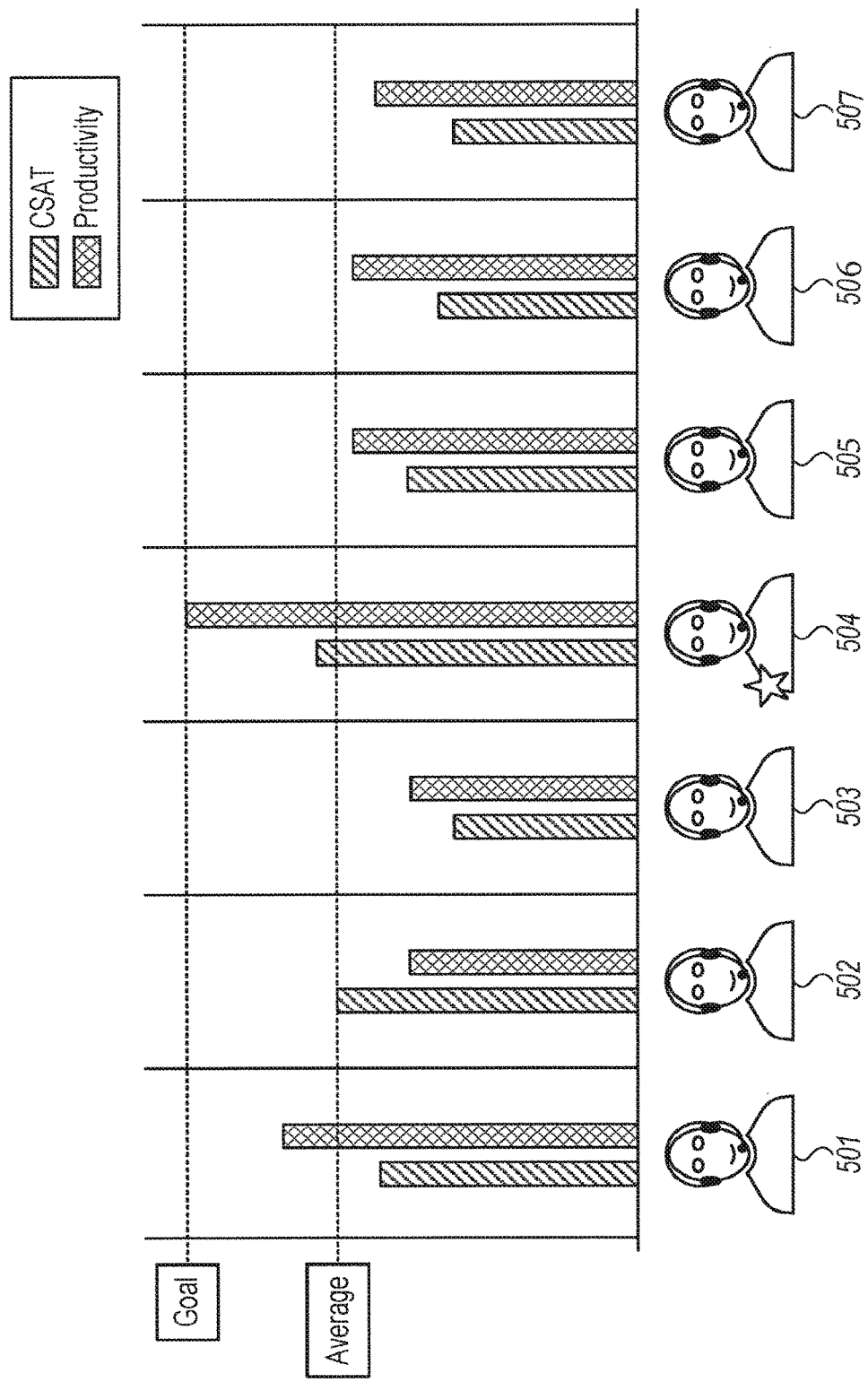
FIG. 5 shows an example of the kind of information that may be held in a workforce management database according to some embodiments of the invention.

FIG. 5 shows an example of the kind of information that may be held in the WFM database 111. In this example CSAT and productivity KPIs are shown for a group of seven agents 501-507, compared to average and target, or goal, KPIs for all of the agents. Agent 504 is the only one with an above average CSAT score and the only one who has reached the goal. Agents 501-507 may be a group of agents selected from a larger pool of agents to work together.

Figure 6:
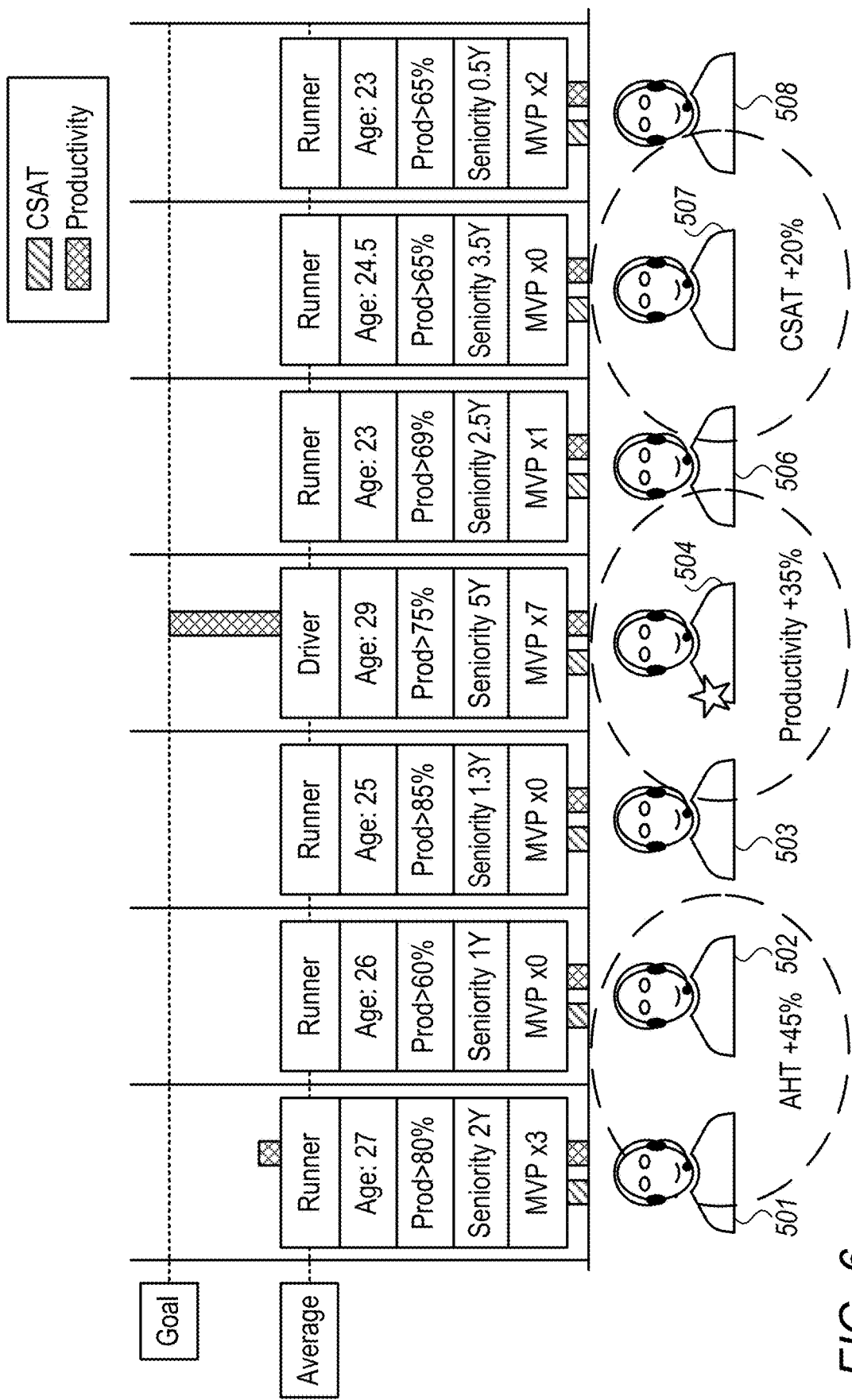
FIG. 6 shows additional information which may be held for workers in a database according to some embodiments of the invention.

FIG. 6 shows additional information which may be held for the agents in the database 111 including AHT and personal information.

It is possible that the inclusion or presence of agent 504 has a positive effect on the performance of the whole group, for example according to a particular performance criterion such as CSAT or productivity. Thus agent 504 might be identified as a leader. Alternatively the inclusion or presence of one or more of the other agents who are not the best performers may have this effect. Some embodiments of the present invention provide an algorithm by which such agents may be identified.

An example of a leader identification algorithm such as may be implemented by scheduler 207 according to some embodiments of the invention will now be described.

The identification of a leader among a group of agents may include outlier detection. In general an outlier may be a value outside of a given range of "normal". Therefore a value such as a performance measure being an outlier is not necessarily an indication that there is anything of actionable interest to that outlier. There are random variations in any collection of statistical data, and simply identifying the top N instances within those sets may not in itself indicate anything of real note. In any non-empty, finite set of numbers, there will always be a (not necessarily unique) minimum and maximum value. That does not mean that those values have any special meaning (e.g., a geographical area may come last in standardized test scores but that does not necessarily implicitly that it is being negligent). Thus according to embodiments of the invention, only those agents for whom there appears to be a correlation between their inclusion or presence in a group and improved performance of a group of agents as a whole are identified as outliers or leaders.

A suitable criterion for outlier detection is that the outlier value differs from the arithmetic mean of a set of values by at least some multiple of the standard deviation of the set. For many outlier detection applications, that multiple is 2 (thus the difference is also known as 2 sigma, sigma being the standard deviation). In a random set of numbers with normal distribution, roughly 5% of the numbers within that set will fall outside of that range. Larger multiples yield fewer potential outliers—3 sigma is roughly 0.3% outliers, 4 sigma about 0.006% outliers, etc. The sensitivity of the algorithm is determined by a threshold sigma value. The customary default setting for this is 2 sigma.

If there is little or no variation in the data, then outliers may not be relevant—clearly if the standard deviation is 0, then all of the values are the same, and so there are no outliers. Similarly if the standard deviation is small relative to the expected range of values, outliers are just as likely to be caused by unavoidable numeric errors as by anything else. For this reason, a relevance threshold setting may be used in the algorithm according to some embodiments of the invention. If the ratio of the standard deviation to the magnitude of the expected range of the data does not exceed this threshold, then no attempt will be made to identify outliers. A reasonable default for this threshold may be around 5%.

According to some embodiments of the invention, the outliers to be found do not come from the agents' KPIs directly, but from the difference in aggregate KPIs during periods in which the agents are and are not present. Furthermore, embodiments of the invention may take account of the possibility that correlation does not imply causation. For example the fact that an agent always or frequently seems to be present when aggregate KPIs for a group are at their highest could be the result of other members of the team who are also present at the same time; or due to a senior agent having preferences for times of day that naturally yield higher KPIs for non-obvious reasons; or merely coincidental.

In the example algorithms described herein, it is assumed that greater KPI values indicate "better" performance; that KPI values have a normal statistical distribution; and that KPIs have little to no sensitivity to net staffing—that is, agents' KPIs are not lowered simply because they are present at times when insufficient or excess staff are present. If necessary, a transform could be defined to derive a new KPI that fits these criteria. The algorithm described herein assumes that any necessary transformations to ensure that these criteria are met have already been done.

The example algorithms described herein use what are termed "aggregate" KPIs. The method of aggregating may be any method known to those skilled in the art, subject to the proviso that the result of aggregation should fall into the same range and statistical distribution as individual KPIs, and should only consider the individual KPIs of agents present during the range being aggregated. An arithmetic mean satisfies these criteria and could thus for example be used for the aggregation.

Evaluation in order to identify outliers need not be limited to a single KPI. Outlier detection could just as easily be performed on multiple KPIs, with only those agents who are identified as outliers in a minimum number of those KPI datasets to be flagged as potential leaders.

Single KPI Algorithm

An example algorithm for a single KPI, which may be implemented in shift server 113, is as follows:
Given P, a pool of agents;
Given K, a collection of KPIs for the agents in P over a range of time;
Given M, the magnitude of the expected range of KPI values;
Given $T_R$, the relevance threshold;
Given $T_S$, the sensitivity threshold;
For each agent A in P:
Let $K_{P-A}$ be the aggregate KPI over all agents in P other than A, and over all time intervals within a range under consideration during which A was present, minus the aggregate KPI over all agents in P and all intervals within the range during which A was not present; $K_{P-A}$ may be considered to be a measure of agent influence on performance.
Let $\overline{K}_{P-A}$ be the arithmetic mean of the set of $K_{P-A}$ for all agents A in P;
Let $D_{P-A}$ be the standard deviation of the set of $K_{P-A}$ for all agents A in P;
If $D_{P-A} > M\, T_R$:
For each agent A in P:
If $K_{P-A} - \overline{K}_{P-A} > D_{P-A}\, T_S$:
Flag agent A as a leader.

It will be appreciated that the algorithm described above can also be used to identify those who have the opposite of the desired influence and are outliers in the opposite direction. Thus some embodiments of the invention may be used to exclude individuals from the type of work under consideration or to require them to work alone.

Thus for example,
If $\overline{K}_{P-A} - K_{P-A} > D_{P-A}\, T_S$:
Agent A may be flagged as a detractor.

Multiple KPI Algorithm

Figure 7A:
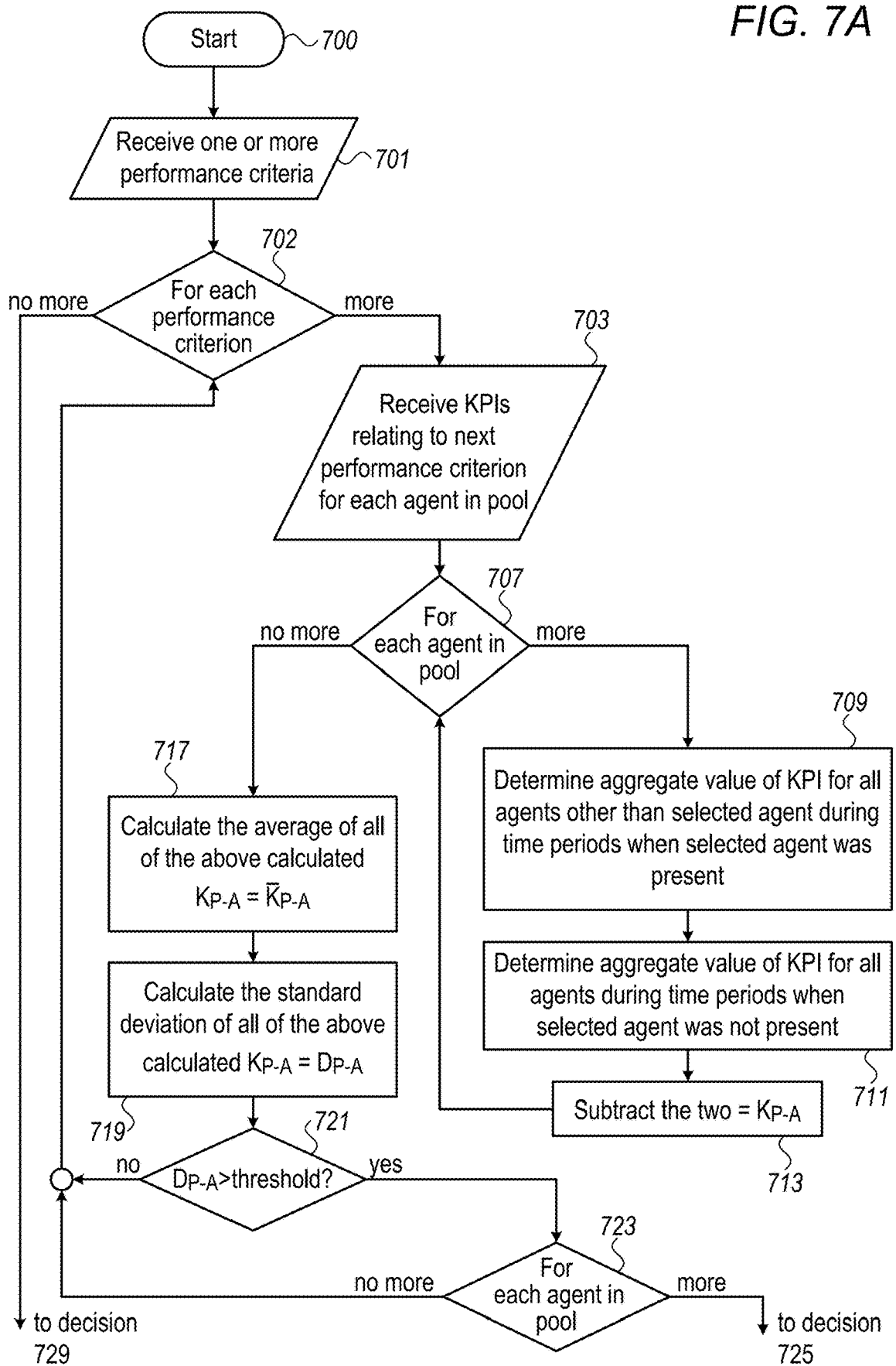
FIGS. 7A and 7B together form a flow chart showing a possible series of operations in a system or method according to some embodiments of the invention.
Figure 7B:
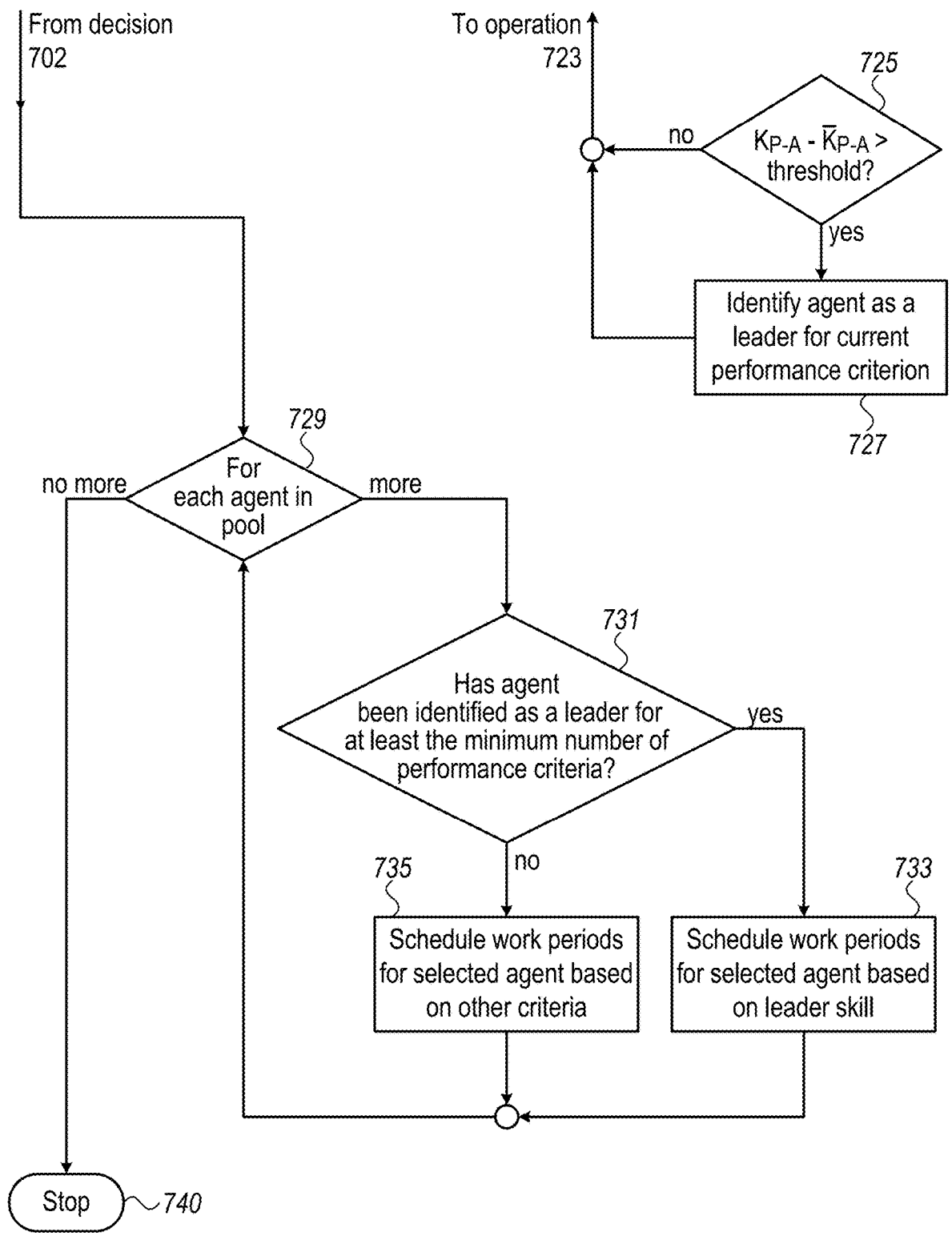

The single KPI algorithm may be adapted in order to identify leaders based on multiple performance criteria. FIGS. 7A and 7B together show a flow chart showing a possible series of operations in the implementation of the algorithm for multiple performance indicators or KPIs, such as may be performed by shift server 113. It will be appreciated that the order of operations is shown by way of example only and in practice the operations may be performed in various different orders. The flow chart of FIGS. 7A and 7B is also applicable where only a single KPI is taken into consideration.

The flow begins with initialization at operation 700 shown in FIG. 7A.

At operation 701 one or more performance criteria may be received, for example via the portal 203. The criteria may be organized in a queue. In subsequent operations performance data relating to a criterion may be analyzed to identify one or more agents as a leader for that criterion. This may be done for each of the criteria received at operation 701. Thus operation 702 may be a check to determine whether operations have been performed for each of the performance criteria. For example operation 702 may be a decision "has $D_{P-A}$ been determined for each performance criterion?" and if no the flow may continue to operation 703 for the next performance criterion in the queue.

At operation 703 KPIs relating to a received performance criterion may be received for each agent in a pool of available agents. The KPIs may be requested for all criteria in response to receiving the performance criteria in operation 701 or the KPIs may have been retrieved previously.

In operations 709 to 711 a measure of the influence of an agent on the performance of the other agents, according to a performance criterion, may be determined for each agent in the pool of agents. Then in operations 717 to 721 the measures for all of the agents may be analyzed to determine whether there are any potential outliers, for example by calculating the standard deviation of the set. Then, for example if there are potential outliers, in operations 723 to 727 one or more agents may be identified as a leader for a particular performance criterion and this leader skill may be used in scheduling work periods for that agent. The process of identification of one or more leaders may be repeated for each performance criterion.

A measure of influence $K_{P-A}$ may be determined for multiple agents, for example each agent in the pool. The agents may be organized in a queue. Thus at operation 707 a decision may be made "has $K_{P-A}$ been determined for every agent?" and if not operations may 709 to 713 may be performed on the next agent in the queue, also referred to as the selected agent.

At operation 709, in a similar manner to the single KPI algorithm, a determination may be made of the aggregate value of KPI for the selected or current performance criterion for agents during time periods when the selected agent was present, for example for all agents in the pool of agents from whom groups may be selected to work together. The aggregate may exclude the KPI of the selected agent. Thus for example if the selected criterion was CSAT, then at operation 709 the aggregate value of CSAT for agents working alongside the selected agent would be determined.

At operation 711, again in a similar manner to the single KPI algorithm, a determination may be made of the aggregate value of KPI for selected performance criterion for agents during time periods when selected agent was not present, for example for all agents in the pool of agents from whom groups may be selected to work together. For example at operation 711 the aggregate value of CSAT for agents working without the presence of the selected agent would be determined.

At operation 713 the results of the two determinations may be subtracted one from another to give the result $K_{P-A}$, a measure of the influence of that agent on the performance of the other agents. Operations 709-713 may be repeated or iterated. When no more agents are to be analyzed for their measure of influence, for example there are no more in the queue, at operation 717 the average value $\overline{K}_{P-A}$ may be determined in a similar manner to the single KPI algorithm.

Next, in order to determine whether there may be outliers in the set of influence measures, the standard deviation of the influence measures $D_{P-A}$ may be determined at operation 719 and at operation 721 $D_{P-A}$ may be compared to a threshold. If $D_{P-A}$ does not exceed the threshold, it may be assumed that there are no outliers, or agents to be identified as leaders, and the flow returns to operation 702. Operations 703-721 may then be repeated for another performance criterion.

If $D_{P-A}$ does exceed the threshold, the flow continues to identify outliers or leaders for the current performance criterion. For multiple agents, e.g. all agents in a pool, the measure of influence $K_{P-A}$ may be compared to the average value of $K_{P-A}$ to determine whether an agent is a leader. The flow may thus continue to a decision 723 to determine whether $\overline{K}_{P-A}-K_{P-A}$ has been determined for multiple agents, e.g. in a queue, for example all agents in a pool. Thus at operation 723 a decision may be made "has $\overline{K}_{P-A}-K_{P-A}$ been determined for every agent?" and if not operations 725 and 727 shown in FIG. 7B may be performed on an agent, for example the next agent in a list.

Then, in order to determine whether the influence of a single agent is exceptional, in a similar manner to the single KPI example, at operation 725 the influence measure for a single agent is compared to the average value. If the difference is greater than a threshold, such as $D_{P-A} T_S$ used in the single KPI example, the agent is flagged as a possible leader in operation 727 for that performance criterion. If the difference is less than the threshold the agent is not flagged as a possible leader and the flow continues to decision 723. If the difference is greater than the threshold the agent may be flagged as a leader for that performance criterion.

Operations 703-727 may be repeated for each of the performance criteria received at operation 701 and for multiple agents, e.g. all agents in a pool. The flow may continue to operation 729.

If an agent satisfies the conditions of operation 725, and is confirmed as a leader for a criterion at operation 727, work periods may be scheduled taking into account this agent skill. If an agent does not satisfy the conditions of operation 725, work periods for that agent may be determined according to other criteria such as any manner known in the art, or if another agent is confirmed as a leader then work periods for that agent may be determined based on the leader skill of one or more other agents.

At operation 729 a decision is made whether work periods have been scheduled for all agents and if not, the next agent, e.g. in a queue, may be selected. At operation 731, for the current agent, a decision is made whether the agent has been identified as a leader or leader for a minimum number of performance criteria, e.g. in a minimum number of KPI datasets such as may have been received at operation 703. In the affirmative, for that agent, at operation 733, work periods for that agent may be scheduled according to the skill "leader". If the agent has not been identified as a leader, work periods for that agent may be scheduled at operation 735 based on other performance criteria in any manner known in the art.

In some alternative embodiments of the invention, decision 731 may simply be whether an agent has been identified as a leader in any dataset, so that leadership in a single performance criterion is used as a skill in word period scheduling.

Figure 11:
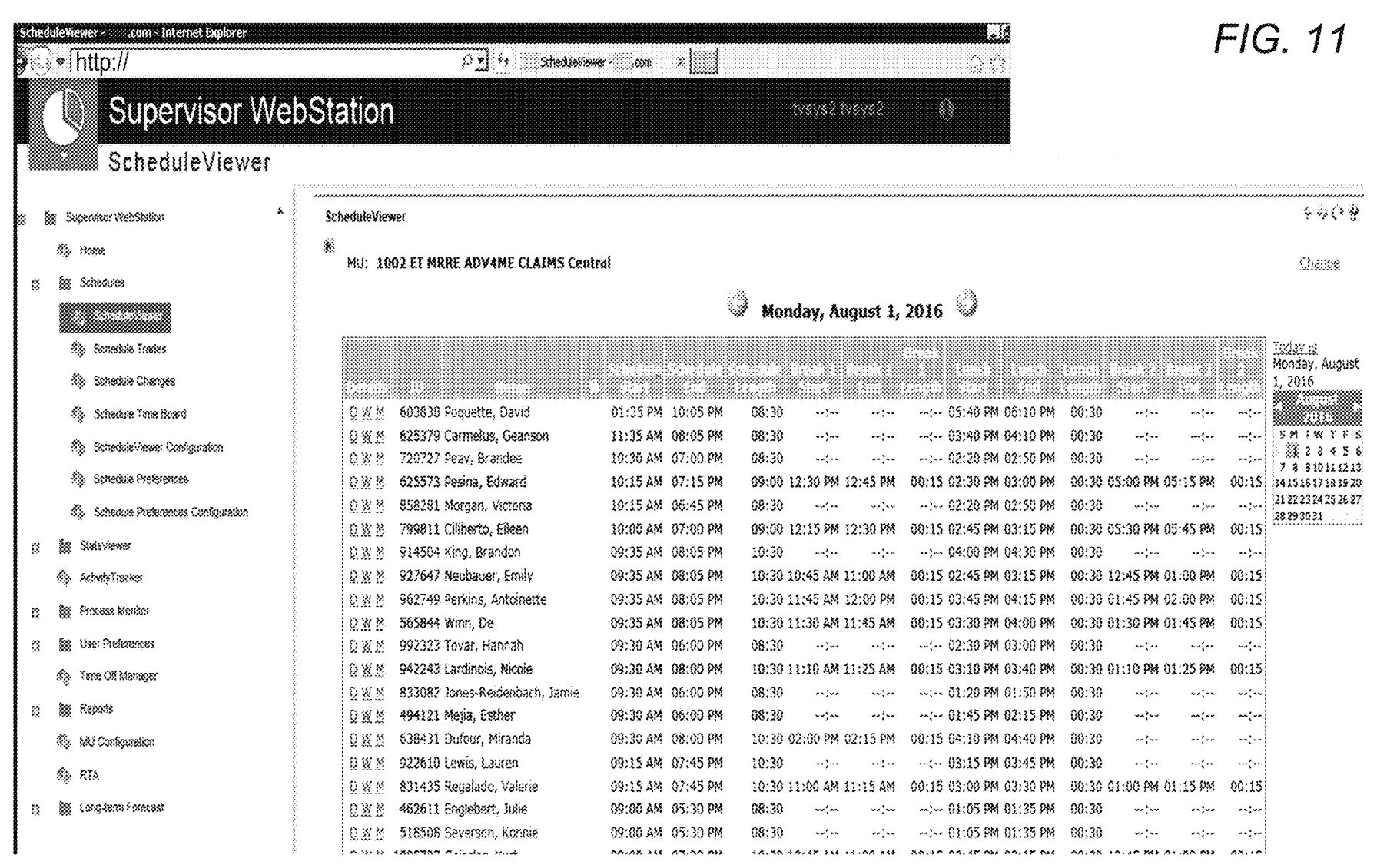

Operations 733 and 735 may comprise creating a schedule of work periods, for example according to the data structure shown in FIG. 11). This may be distributed or otherwise communicated to a user or agents or both in any way. For example the schedule may be displayed to a user via a display at the shift server 113, and it may be transmitted to one or more workstations such as agent workstations 101 where it may be displayed.

The scheduler 207 may have the capability to schedule shifts, e.g. create a schedule of work periods, according to one or more rules. The scheduling may be based on one or more skills attributed to an agent. One of those skills may be "leader" determined for example according to the algorithm described herein. The scheduler may then implement one or more rules to schedule work periods based on one or more skills attributed to agents in which the one or more skills includes leader. The rules may provide that the scheduler is required to take account of factors other than agents' skills when scheduling work periods. The rules may be applied according to an order such that, for example, rules which take account of agent skills are overridden by other rules. According to some embodiments of the invention, if sufficient agents are identified as leaders, the work period scheduling may, subject to any overriding rules, schedule work periods so that each one includes a leader. In case there are not sufficient agents, work periods may be organized in a hierarchy such that a leader agent is present during more important work periods.

Systems and methods for work period scheduling according to agents' skills are known in the art. For example, it is known to define skills per agent (e.g. languages) and define, e.g. using rules, how many agents with each skill are required per shift (e.g. 10 English speakers, 5 Spanish speakers, 2 French speakers).

One example of a method for scheduling personnel based on their skill levels is shown in U.S. Pat. No. 6,044,355. In this example a schedule is generated using an iterative process using call handling simulation. In some systems and methods according to embodiments of the present invention, schedules may be generated in any known manner with "leader" being one of the skills taken into account. One or more rules implemented in the shift server may require at least one leader per shift, to the extent that leaders are available.

Some embodiments of the invention enable the provision of insights into

Personal performance of individual workers

The influence of personal and team KPIs

Those insights may be used to infer connections between individuals that may drive performance.

Knowing who are drivers or detractors in terms of measuring how their presence/performance affects the team KPI's, and compared to the other team members in the shifts can lead to an efficient shifts assignment of workers, and drive performance that is based on profiling.

Embodiments of the invention may be used in various ways. For example according to some embodiments of the invention, a profiling model may be trained, and used to provide input to a WFM system. When a workforce supervisor/shift manager is to create a new set of shifts an appropriate match of workers may be presented according to his or the upper management selected performance criteria, for example determined by KPI. If for example a "AHT<3 minutes" was selected as a primary KPI, some embodiments of the invention may be used to present the best combination of people that will likely meet this target. The supervisor/shift manager will be able to offer the employees the shifts and times in a way that will incorporate the required profiles.

Some embodiments of the invention provide systems and methods to define a target formula based on one or more KPIs and one or more weights and to identify 'leaders' in the workers' population whose presence during the shift may help to maximize this target formula and potentially improve the performance of the pool of workers as a whole. The system can then create schedules for the agents in a way that these 'leaders' will be spread across the different shifts to make sure that this target formula is being maximized during all the shifts.

Figure 8:
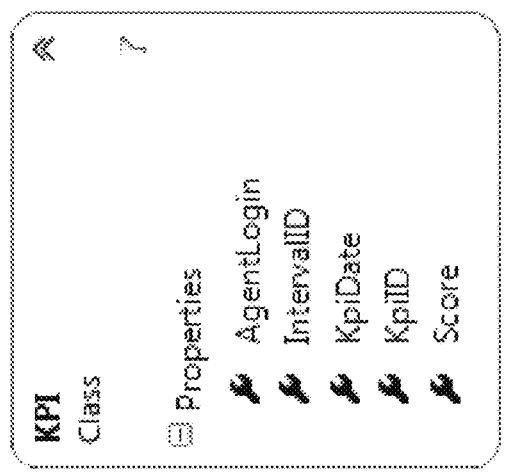
FIG. 8 shows an application programming interface and objects that may be used in the persistence of performance indicator data according to some embodiments of the invention.
Figure 8:
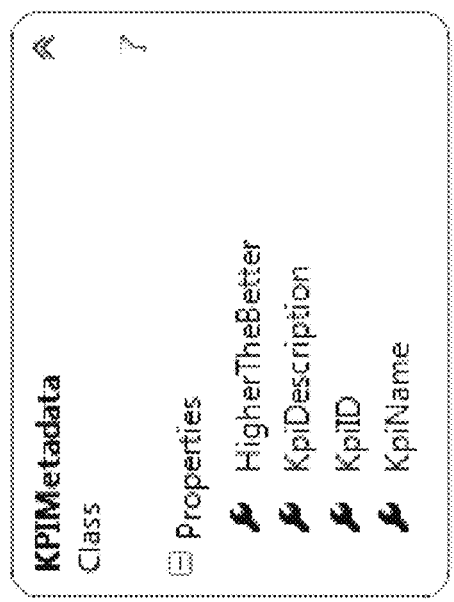
Figure 8:
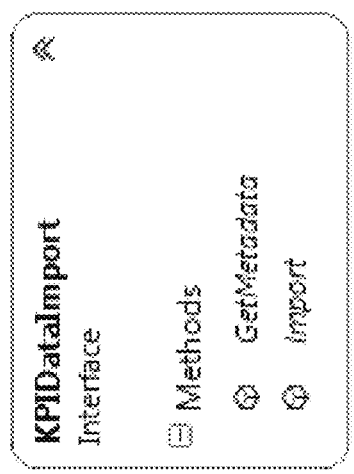

FIG. 8 shows example application programming interfaces "APIs" and objects which may be used according to some embodiments of the invention in order to persist KPI data.

In the example of FIG. 8, a KPIDataImport interface may include:

GetMetaData method—an API provided to one or more components external to the shift scheduler 207 for use in obtaining KPI metadata that is defined in the system. The external components then know which KPI IDs to use, for example what is the KPI name, etc.). The return object may be a list of KPIMetadata data structure object.

Import method—an API provided to one or more components external the shift scheduler 207 to provide the ability to import the actual KPI data. The input argument is a list of KPI data structure object. The return value is true\false.

Figure 9:
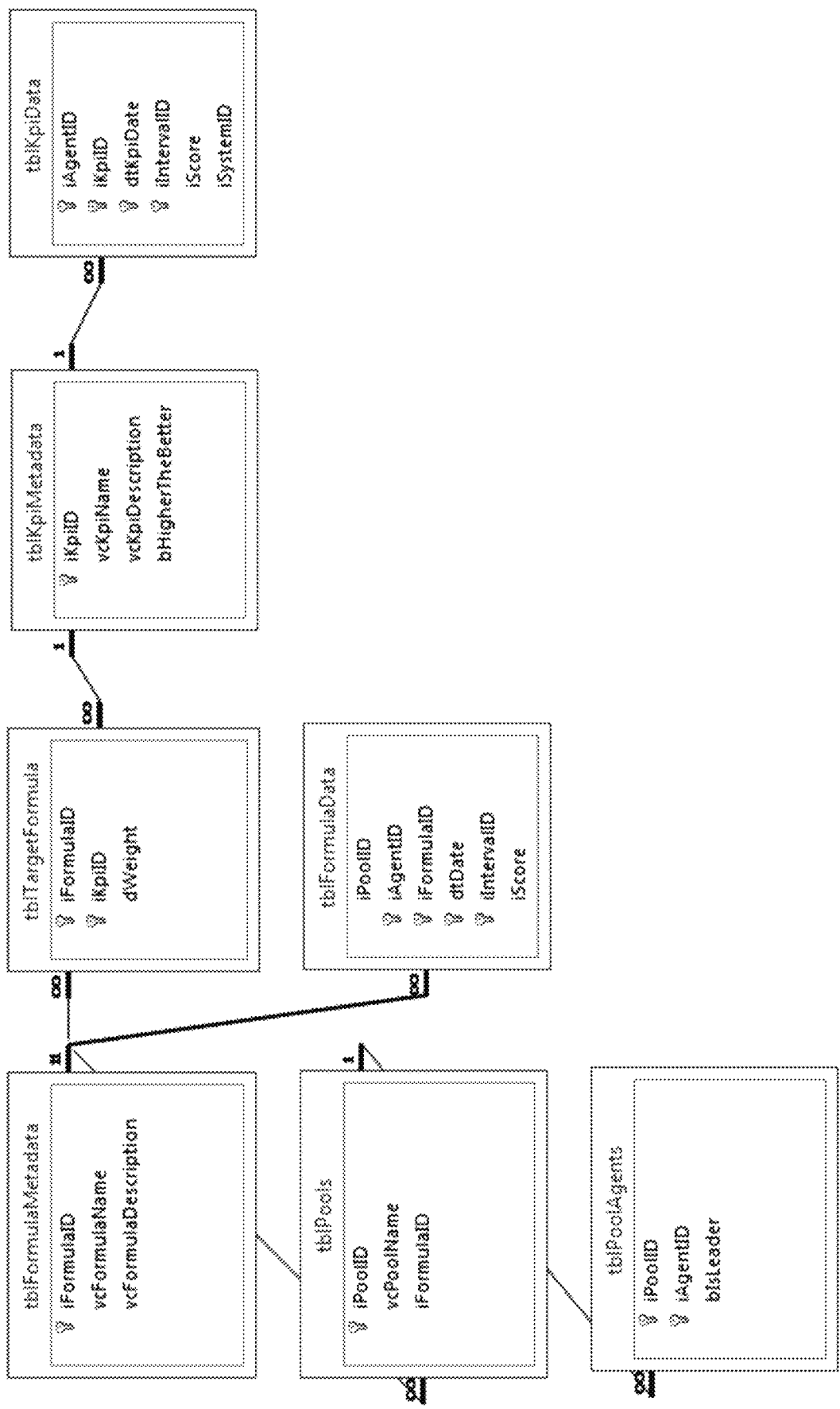
FIG. 9 shows a data set which may be used by a scheduler according to some embodiments of the invention.

FIG. 9 shows example scheduler and portal flows which may be used according to some embodiments of the invention. These examples contain relevant information regarding KPI definitions (metadata), actual aggregated data, building target formulas and presentation of leaders.

The dataset may comprise for example:

tblKPIMetadata table—containing the metadata of the different KPIs that are defined in the system tblFormulaMetadata table—containing the metadata of different target formulas defined in the system tblTargetFormula table—containing the actual definition of the formula (e.g. a set of KPI and Weight values)

tblKpiData table—containing the actual data of the KPIs values that were imported to the system tblPools table—containing the metadata of the different pools and their mapping to the target formula that is used by the pool tblPoolAgents table—containing the mapping of the agents to the pools tblFormulaData table—containing the actual data of the target formula calculation per agent per interval.

Reference is made to FIG. 10, showing high level block diagram of an exemplary computing device according to embodiments of the present invention. Computing device 1000 may include a controller 1005 that may be, for example, a central processing unit processor (CPU), a chip or any suitable computing or computational device, an operating system 1015, a memory 1020, a storage 1030, input devices 1035 and output devices 1040.

Operating system 1015 may be or may include any code segment designed and/or configured to perform tasks involving coordination, scheduling, arbitration, supervising, controlling or otherwise managing operation of computing device 1000, for example, scheduling execution of programs. Operating system 1015 may be a commercial operating system. Memory 1020 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 1020 may be or may include a plurality of, possibly different memory units. Memory 1020 may, when in different devices described herein, store data and databases, such as RT database 104 and WFM database 111.

Executable code 1025 may be any executable code, e.g., an application, a program, a process, task or script. Executable code 1025 may be executed by controller 1005 possibly under control of operating system 1015. For example, executable code 1025 may be an application implementing a work period scheduling process according to some embodiments of the invention. Where applicable, executable code 1025 may carry out operations described herein in real-time. Computing device 1000 and executable code 125 may be configured to update, process and/or act upon information at the same rate the information, or a relevant event, are received. In some embodiments, more than one computing device 1000 may be used. For example, a plurality of computing devices that include components similar to those included in computing device 1000 may be connected to a network and used as a system. For example, work period scheduling may be performed in realtime by executable code 1025 when executed on one or more computing devices such computing device 1000.

Storage 1030 may be or may include, for example, a hard disk drive, a floppy disk drive, a Compact Disk (CD) drive, a CD-Recordable (CD-R) drive, a universal serial bus (USB) device or other suitable removable and/or fixed storage unit. Content may be stored in storage 1030 and may be loaded from storage 1030 into memory 1020 where it may be processed by controller 1005. In some embodiments, some of the components shown in FIG. 10 may be omitted. For example, memory 1020 may be a non-volatile memory having the storage capacity of storage 1030. Accordingly, although shown as a separate component, storage 1030 may be embedded or included in memory 1020.

Input devices 1035 may be or may include a mouse, a keyboard, a touch screen or pad or any suitable input device. It will be recognized that any suitable number of input devices may be operatively connected to computing device 1000 as shown by block 1035. Output devices 1040 may include one or more displays, speakers and/or any other suitable output devices. It will be recognized that any suitable number of output devices may be operatively connected to computing device 1000 as shown by block 1040. Any applicable input/output (I/O) devices may be connected to computing device 1000 as shown by blocks 1035 and 1040. For example, a wired or wireless network interface card (NIC), a modem, printer or facsimile machine, a universal serial bus (USB) device or external hard drive may be included in input devices 1035 and/or output devices 1040.

Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which, when executed by a processor or controller, carry out methods disclosed herein. For example, a storage medium such as memory 1020, computer-executable instructions such as executable code 1025 and a controller such as controller 1005.

FIG. 11 shows an example shift schedule that may be created according to some embodiments of the invention. In the example, all of the agents have been designated to work basically the same schedule with fewer agents between 9 am to 9:30 am when there is a forecast for less incoming calls. One of the agents has been identified as a leader. Similarly for other work periods at least one leader may be included, with the aim of increasing overall team performance.

Some embodiments may be provided in a computer program product that may include a non-transitory machine-readable medium, stored thereon instructions, which may be used to program a computer, or other programmable devices, to perform methods as disclosed herein. Embodiments of the invention may include an article such as a computer or processor non-transitory readable medium, or a computer or processor non-transitory storage medium, such as for example a memory, a disk drive, or a USB flash memory, encoding, including or storing instructions, e.g., computer-executable instructions, which when executed by a processor or controller, carry out methods disclosed herein. The storage medium may include, but is not limited to, any type of disk including floppy disks, optical disks, compact disk read-only memories (CD-ROMs), rewritable compact disk (CD-RWs), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

A system according to embodiments of the invention may include components such as, but not limited to, a plurality of central processing units (CPU) or any other suitable multi-purpose or specific processors or controllers, a plurality of input units, a plurality of output units, a plurality of memory units, and a plurality of storage units.

A system may additionally include other suitable hardware components and/or software components. In some embodiments, a system may include or may be, for example, a personal computer, a desktop computer, a mobile computer, a laptop computer, a notebook computer, a terminal, a workstation, a server computer, a Personal Digital Assistant (PDA) device, a tablet computer, a network device, or any other suitable computing device. Unless explicitly stated, the method embodiments described herein are not constrained to a particular order or sequence. Additionally, some of the described method embodiments or elements thereof can occur or be performed at the same point in time.

Unless explicitly stated, the method embodiments described herein are not constrained to a particular order or sequence. Additionally, some of the described method embodiments or elements thereof can occur or be performed at the same point in time.

Embodiments of the invention may include an article such as a computer or processor readable non-transitory storage medium, such as for example a memory, a disk drive, or a USB flash memory encoding, including or storing instructions, e.g., computer-executable instructions, which when executed by a processor or controller, cause the processor or controller to carry out methods disclosed herein. In some embodiments, a computer processor or computer controller, e.g., forming part of shift server 113, may be configured to carry out embodiments of the invention, for example by executing software or code stored in a memory connected to the processor, and/or by having dedicated circuitry. Thus some embodiments of the invention may comprise a transitory or non-transitory computer readable medium which when implemented in the computer or computing system cause the computer to perform operations of methods according to embodiments of the invention.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

What is claimed is:

1. A system for analyzing performance data comprising: a work force management server operating one or more processors and outputting data to a work force management database comprising a memory to store performance data; a real-time server providing information collected about individual workers to the work force management server, at least some of the information produced by processor-executed applications operating on agent workstations; a voice of customer server providing customer satisfaction data to the work force management server; a service layer executing one or more processors to receive a request for a schedule, and place the request in a queue; and a scheduler operating one or more data processors configured to: retrieve the request from the queue; receive from the work force management database performance data relating to the performance of one or more individual workers; analyze the performance data to identify one or more workers as a leader, wherein a leader is a worker whose presence in a group of the individual workers results in an improvement in overall performance of said group, a worker being a leader it an aggregate value of one or more performance indicators for a criterion over workers in a pool during time periods when the worker was present, minus an aggregate value of the one or more performance indicators for the criterion over workers in the pool during time periods when the worker was not present, is greater than a threshold; and based on the identification of one or more workers as a leader automatically create a schedule of work periods based on one or more skills attributed to one or more workers, such that for each schedule work period, a leader is included in the work period with the aim of increasing performance of workers assigned to the work period.

2. A system for analyzing performance data according to claim 1 wherein: the database comprises performance data based on a plurality of criteria; and the scheduler further comprises a portal configured to receive a selection of one or more of said criteria.

3. A system for analyzing performance data according to claim 1 in which said aggregate values are used to determine a measure of the influence of that worker on the performance of the other workers.

4. A system for analyzing performance data according to claim 3 wherein a measure of influence is determined for respective multiple workers in the pool of workers.

5. A system for analyzing performance data according to claim 2 wherein each of one or more workers are identified as leaders with respect to any one of said one or more of said criteria.

6. A system for analyzing performance data according to claim 1 wherein multiple workers are identified as leaders and wherein work periods are scheduled to maximize the distribution of leaders across work periods.

7. A system for analyzing performance data according to claim 1, further comprising a user interface.

8. A system for analyzing performance data according to claim 1 wherein the aggregate value of the one or more performance indicators for a criterion over workers in a pool during time periods when the worker was present is calculated using a weighted sum; and the aggregate value of the one or more performance indicators for the criterion over workers in the pool during time periods when the worker was not present is calculated using a weighted sum.

9. A system for analyzing performance data according to claim 1 wherein the scheduler is configured to analyze the performance data to identify one or more workers as a detractor, wherein a detractor is a worker whose presence in a group of the individual workers results in a lowering in overall performance of said group, a worker being a detractor if an aggregate value of one or more performance indicators for a criterion over workers in a pool during time periods when the worker was not present, minus an aggregate value of the one or more performance indicators for the criterion over workers in the pool during time periods when the worker was present, is greater than a threshold.

10. A method of analyzing performance data comprising: receiving at a work force management server performance data relating to the performance of one or more individual workers and storing the data in the work force management database, at least some of the performance data produced by processor-executed applications operating on agent workstations; providing via a voice of customer server customer satisfaction data to the work force management server; providing by a real-time server providing information collected about individual workers to the work force management server; at a service layer receiving a request for a schedule, and placing the request in a queue; and at a scheduler operating one or more data processors: retrieving the request from the queue; receiving from the work force management database performance data relating to the performance of one or more individual workers; analyzing the performance data to identify one or more workers as a leader, wherein a leader is a worker whose presence in a group of the individual workers results in an improvement in overall performance of said group, a worker being a leader if an aggregate value of a performance indicator for a criterion over workers in a pool during time periods when the worker was present, minus an aggregate value of the performance indicator for the criterion over workers in the pool during time periods when the worker was not present, is greater than a threshold; and based on the identification of one or more workers as a leader automatically creating a schedule of work periods based on one or more skills attributed to one or more workers, such that for each schedule work period, a leader is included in the work period with the aim of increasing performance of workers assigned to the work period.

11. A method according to claim 10 further comprising receiving a selection of one or more criteria.

12. A method according to claim 11 wherein said analyzing is according to said one or more criteria and said identifying identifies one or more workers as leaders according to respective criteria.

13. A method according to claim 1 in which said aggregate value is used to determine a measure of the influence of that worker on the performance of the other workers.

14. A method according to claim 13 wherein a measure of influence is determined for respective multiple workers in the pool of workers.

15. A method according to claim 14 wherein said analysis uses multiple criteria, and one or more workers are identified as leaders with respect to one of said criteria.

16. A method according to claim 10 wherein multiple workers are identified as leaders and wherein work periods are scheduled to maximize the distribution of leaders across work periods.

17. A method of analyzing performance data comprising: receiving at a work force management server operating one or more processors performance indicators relating to the performance of respective individual workers in a workforce, the performance indicators including different performance indicators measured according to different criteria, at least some of the performance indicators produced by processor-executed applications operating on agent workstations; providing via a voice of customer server customer satisfaction data to the work force management server; outputting from the work force management server data to a work force management database comprising a memory to store performance data; at a real-time server providing information collected about individual workers to the work force management server; at a service layer executing one or more processors receiving a request for a schedule, and placing the request in a queue; receiving one or more performance criteria, retrieving the request from the queue; analyzing the one or more performance indicators to identify one or more workers as a leader according to the received one or more performance criteria, wherein a leader is a worker whose presence in a group of the individual workers results in an improvement in overall performance of said group according to the received one or more performance criteria, a worker being a leader if an aggregate value of a performance indicator for a criterion over workers in a pool during time periods when the worker was present, minus an aggregate value of the performance indicator for the criterion over workers in the pool during time periods when the worker was not present, is greater than a threshold; and based on the identification of one or more workers as a leader automatically creating a schedule of work periods based on one or more skills attributed to one or more workers, such that for each work period, a leader is included in the work period with the aim of increasing performance of workers assigned to the work period.

* * * * *